(12) United States Patent
Gibson et al.

(10) Patent No.: US 9,950,705 B2
(45) Date of Patent: Apr. 24, 2018

(54) HYBRID VEHICLE AND METHOD OF CONTROLLING AN ENGINE DISCONNECT CLUTCH FOR ENGINE START-UP

(71) Applicant: FORD GLOBAL TECHNOLOGIES, LLC, Dearborn, MI (US)

(72) Inventors: Alexander O'Connor Gibson, Ann Arbor, MI (US); Felix Nedorezov, Rochester Hills, MI (US); Jeffrey Allen Doering, Canton, MI (US); Xiaoyong Wang, Novi, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 14/802,335

(22) Filed: Jul. 17, 2015

(65) Prior Publication Data

US 2017/0015297 A1  Jan. 19, 2017

(51) Int. Cl.
*B60W 20/00* (2016.01)
*B60W 10/02* (2006.01)
(Continued)

(52) U.S. Cl.
CPC ............ *B60W 20/00* (2013.01); *B60W 10/02* (2013.01); *B60W 10/06* (2013.01);
(Continued)

(58) Field of Classification Search
CPC .................................................... B60W 20/00
(Continued)

(56) References Cited

U.S. PATENT DOCUMENTS

| 8,651,998 B2 * | 2/2014 | Schenk ..................... B60K 6/48 |
| | | 477/181 |
| 2006/0137921 A1 | 6/2006 | Colvin et al. |

(Continued)

FOREIGN PATENT DOCUMENTS

KR  10-2013-0163784  * 12/2013  ............. B60W 20/40
WO  PCT/EP2008/066598  * 10/2010  ............. B60K 6/365

OTHER PUBLICATIONS

Modeling and control of flexible HEV charging station upgraded with flywheel energy storage; Tomislav Dragičević; Qobad Shafiee; Dan Wu; Lexuan Meng; Juan C. Vasquez; Josep M. Guerrero; Systems, Signals & Devices (SSD), 2014 11th International Multi-Conference on; Year: 2014; pp. 1-7, DOI: 10.1109/SSD.2014.6808864.*

(Continued)

*Primary Examiner* — Cuong H Nguyen
(74) *Attorney, Agent, or Firm* — David Kelley; Brooks Kushman P.C.

(57) ABSTRACT

A vehicle includes an engine, a transmission, a clutch, and a controller. The clutch is configured to couple the engine and transmission during engine starts. The controller is programmed to alter an engine start torque apply schedule for the clutch such that the actual engine start time is less than the upper threshold time for a next engine start event. The controller may be further programmed to, in response to the actual engine start time being less than a lower threshold time for the engine start event, alter the engine start torque apply schedule for the clutch such the actual engine start time is greater than the lower threshold time for a next engine start event.

16 Claims, 3 Drawing Sheets

(51) Int. Cl.
  *B60W 10/06* (2006.01)
  *B60K 6/48* (2007.10)
  *B60W 50/00* (2006.01)

(52) U.S. Cl.
  CPC .............. *B60K 2006/4825* (2013.01); *B60W 2050/0088* (2013.01); *B60W 2710/027* (2013.01); *B60Y 2200/92* (2013.01); *Y02T 10/6252* (2013.01); *Y10S 903/903* (2013.01)

(58) Field of Classification Search
  USPC ............. 701/22, 113, 67; 903/902–904, 912; 180/65.265, 65.28; 477/5–6
  See application file for complete search history.

(56) References Cited

U.S. PATENT DOCUMENTS

| | | | | |
|---|---|---|---|---|
| 2010/0056328 | A1* | 3/2010 | Schenk | B60K 6/48 477/8 |
| 2011/0040432 | A1* | 2/2011 | Kaltenbach | B60K 6/365 701/22 |
| 2011/0130901 | A1* | 6/2011 | Mori | B60K 6/445 701/22 |
| 2013/0296109 | A1* | 11/2013 | Nedorezov | B60W 10/06 477/5 |
| 2013/0297105 | A1 | 11/2013 | Yamazaki et al. | |
| 2014/0004997 | A1 | 1/2014 | Wang et al. | |
| 2014/0172219 | A1* | 6/2014 | Nakanishi | B60K 6/48 701/22 |
| 2015/0019061 | A1* | 1/2015 | Ueno | B60K 6/48 701/22 |
| 2015/0183424 | A1* | 7/2015 | Kim | B60W 20/40 701/22 |
| 2015/0211466 | A1* | 7/2015 | Puri | F02N 11/08 701/22 |
| 2017/0015308 | A1* | 1/2017 | Ortmann | B60W 20/40 |

OTHER PUBLICATIONS

Discrete-time model of an IPMSM based on variational integrators; Andreas Specht; Sina Ober-Blöbaum; Oliver Wallscheid; Christoph Romaus; Joachim Böcker; Electric Machines & Drives Conference (IEMDC), 2013 IEEE International; Year: 2013 pp. 1411-1417, DOI: 10.1109/IEMDC.2013.6556322.*

Hierarchical control of dry clutch for engine-start process in a parallel hybrid electric vehicle; Xiangyu Wang; Liang Li; Chao Yang IEEE Transactions on Transportation Electrification; Year: 2016, vol. PP, Issue: 99; pp. 1-1, DOI: 10.1109/TTE.2016.2535316.*

Slip control for a lock-up clutch with a robust control method; K. Adachi; Y. Ochi; S. Segawa; A. Higashimata; SICE 2004 Annual Conference; Year: 2004, vol. 1; pp. 744-749 vol. 1.*

* cited by examiner

HYBRID VEHICLE AND METHOD OF CONTROLLING AN ENGINE DISCONNECT CLUTCH FOR ENGINE START-UP

TECHNICAL FIELD

The present disclosure relates to hybrid vehicles and adjusting the torque of an engine disconnect clutch during engine starting events.

BACKGROUND

Hybrid vehicles may include an engine disconnect clutch that is configured to disconnect an internal combustion engine from the vehicle powertrain. The engine disconnect clutch may disconnect the engine from the powertrain when the vehicle is operating in an electric only mode in order to improve fuel efficiency.

SUMMARY

A vehicle is provided. The vehicle includes an engine, a transmission, a clutch, and a controller. The clutch is configured to couple the engine and transmission during engine starts. The controller is programmed to, in response to an actual engine start time exceeding an upper threshold time for an engine start event, alter an engine start torque apply schedule for the clutch such that the actual engine start time is less than the upper threshold time for a next engine start event.

A method of operating a clutch configured to couple an engine to a transmission of a vehicle during engine starts is provided. The method includes, in response to an actual engine start time exceeding an upper threshold time for an engine start event, altering an engine start torque apply schedule for the clutch such that the actual engine start time is less than the upper threshold time for a subsequent engine start event.

A vehicle is provided. The vehicle includes an engine, a transmission, a clutch, and a controller. The clutch is configured to couple the engine to the transmission during engine starts. The controller is programmed to, in response to an actual engine start time falling outside a target time range, alter an engine start torque apply schedule for the clutch such that the actual engine start time falls within the target time range for a subsequent engine start event.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
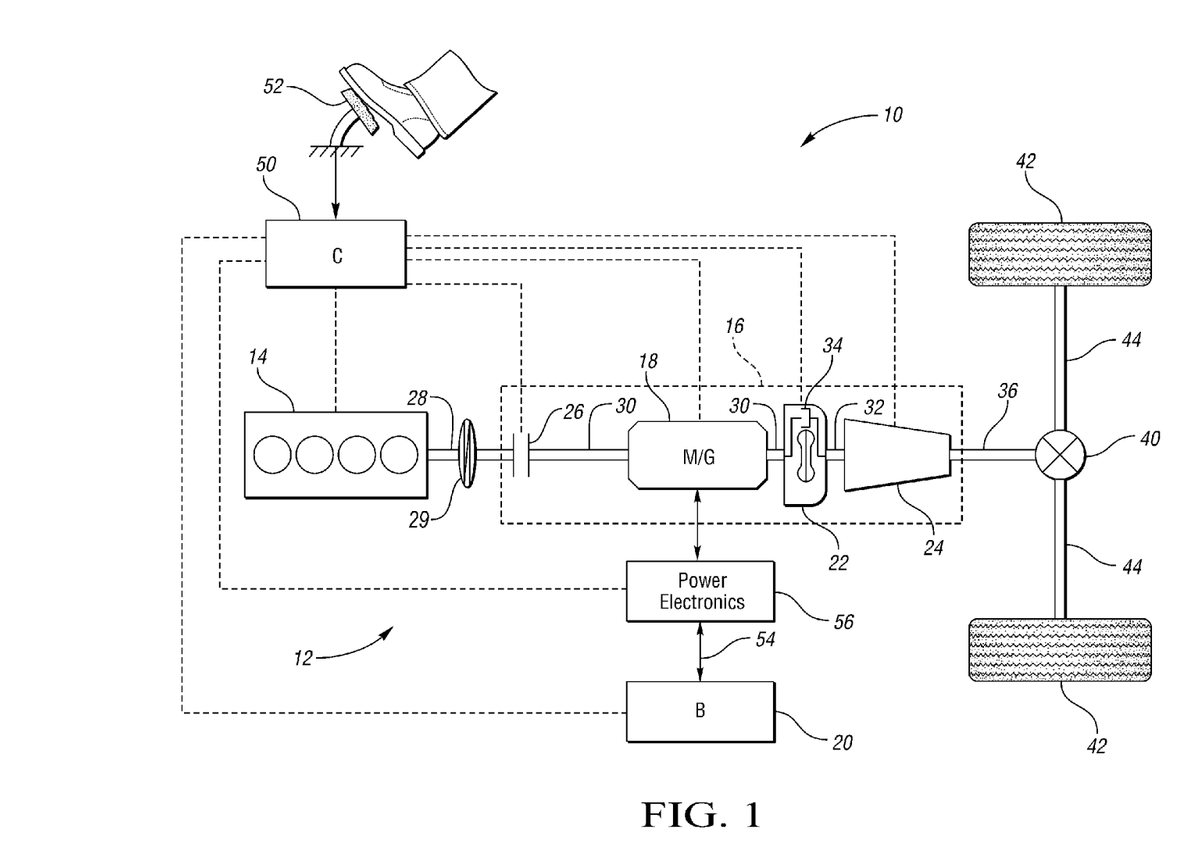
FIG. 1 is a schematic illustration of an example powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric-machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. A flywheel 29, which may be dual mass flywheel, may be disposed on the crankshaft 28 between the engine 14 and the disconnect clutch 26. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode." If the M/G 18 is not assisting the engine 14 by providing additional power to turn the shaft 30, this operation mode may be referred to as an "engine only" mode.

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

The M/G 18 may be used to crank and start the engine 14 when the HEV 10 is transitioning to the "hybrid mode" or "engine only" mode from the "electric only" mode or from condition where neither the M/G 18 or engine 14 are transferring power through the powertrain 12. Power is transferred from the M/G 18 to engine 14 in order to start the engine 14 by at least partially engaging the disconnect clutch 26 to transfer at least a portion of the M/G 18 torque through the disconnect clutch 26 to the engine 14.

The disconnect clutch 26 may be any type of clutch known by one who is skilled in the art. For example, the disconnect clutch 26 may be a hydraulic clutch or dry clutch. If the disconnect clutch 26 is a hydraulic clutch, hydraulic fluid is utilized to engage or disengage opposing sides of the clutch. It should be noted that the hydraulic fluid may be the transmission oil that is also used in the torque converter 22 and gearbox 24 of the transmission 16. If the disconnect clutch 26 is a hydraulic clutch, the torque of the disconnect clutch while engaging, $T_{DCC}$, may be based on Equation (1):

$$T_{DCC} = mu(P_{apply} - P_{stroke})A_{clutch} \qquad (1)$$

mu is the clutch coefficient of friction, which is a function of hydraulic fluid temperature and the temperature of the clutch components.

$P_{apply}$ is the clutch apply pressure generated by advancing the piston to engage the opposing sides of the clutch.

$P_{stroke}$ is a return pressure that biases the hydraulic clutch into an open position. The return pressure may be generated by a spring, hydraulic pressure, pneumatic pressure, electrical mechanical devices, or other appropriate means. $P_{stroke}$ is the equal to $P_{apply}$ when the clutch just begins to transmit torque. It should be noted that $T_{DCC}$ equals zero until $P_{stroke}$ obtains a value that exceeds $P_{apply}$.

$A_{clutch}$ is the effective area of engagement between the opposing sides the hydraulic clutch.

Alternatively, if the disconnect clutch 26 is a dry clutch, the clutch apply pressure may be generated by means other than hydraulic pressure. For example, the clutch pressure may be generated by a pneumatic device (e.g., pneumatic cylinder) or an electrical mechanical device (e.g., electric motor, electric solenoid, etc.). The torque of a dry disconnect clutch while engaging, $T_{DDC}$, may be based on an equation similar to Equation 1, however, the clutch apply pressure, $P_{apply}$, would be a function of the device (e.g., pneumatic or electromechanical device) utilized to generate the clutch apply pressure, and the coefficient of friction, mu, would be a function of the clutch components alone (which may take into account the temperature of the clutch components).

The time it takes for the engine 14 to start-up (i.e., the engine start-up time), during an engine starting event where power is transferred from the M/G 18 to the engine 14 via the disconnect clutch 26, may be divided into two distinct time periods. The first time period may correspond to a cranking time of the engine 14. The cranking time may correspond to the time it takes to crank the engine 14 from a stopped or shutdown position to a first firing top dead center position were fuel and spark are applied and combustion of the engine 14 commences. During the cranking time, the crankshaft 28 is rotated initiating movement of the pistons and other internal components of the engine 14 until the first firing top dead center position is obtained.

The cranking time of the engine 14 may be may be based on Equations (2) and (3):

$$\Delta\theta = \omega_0 t + 1/2 \alpha_{ave} t^2 \quad (2)$$

$$I_{crank} \alpha_{ave} = T_{DCC\_ave} - T_{comp\_ave} \quad (3)$$

$\Delta\theta$ is angular displacement of the crankshaft 28, which may correspond to the angular displacement of the crankshaft 28 during the cranking time of the engine 14.

$\omega_0$ is an initial angular velocity of the crankshaft 28, which may correspond to a value of zero during the cranking time of the engine 14.

$\alpha_{ave}$ is the average angular acceleration of the crankshaft 28, which may correspond to an average acceleration of the crankshaft 28 during the cranking time of the engine 14.

t is the cranking time of the engine 14, which may correspond to the time it takes to rotate the crankshaft 28 from the stopped or shutdown position to the first firing top dead center position.

$I_{crank}$ is the moment of inertia of the crankshaft 28 and any corresponding pistons that are connected to the crankshaft.

$T_{DCC\_ave}$ is the average torque of the disconnect clutch 26, which may correspond to the average torque of disconnect clutch 26 during the cranking time of the engine 14.

$T_{comp\_ave}$ is the average cylinder pressure compression torque that results from the pistons of the engine 14 moving within the cylinders of the engine 14, which may correspond to the average cylinder pressure compression torque during the cranking time of the engine.

Equations (2) and (3) may also adapted to take into account the internal friction forces of the engine 14 components (e.g., pistons, crankshaft, etc.).

The second time period, immediately following the cranking time of the engine 14, may correspond to a run-up time of the engine 14. During the run-up time, the combustion of the engine 14 is controlled until the engine 14 reaches the output speed of the disconnect clutch 26 (the output speed of the disconnect clutch 26 may correspond to the speed of the M/G 18). The combustion of the engine 14 may be controlled during the run-up time to obtain an engine speed using a feedback of the output speed of the disconnect clutch 26.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Although the embodiment illustrated in FIG. 1 depicts a parallel hybrid vehicle structure, the disclosure should be construed to include other hybrid vehicle configurations including series hybrid vehicles, series-parallel hybrid vehicles, power-split hybrid vehicles, plug-in hybrid electric vehicles (PHEVs), electric-fuel cell hybrid vehicles, micro hybrid vehicles (vehicles with engine start-stop systems), or any other hybrid vehicle configuration known in the art.

Figure 2:
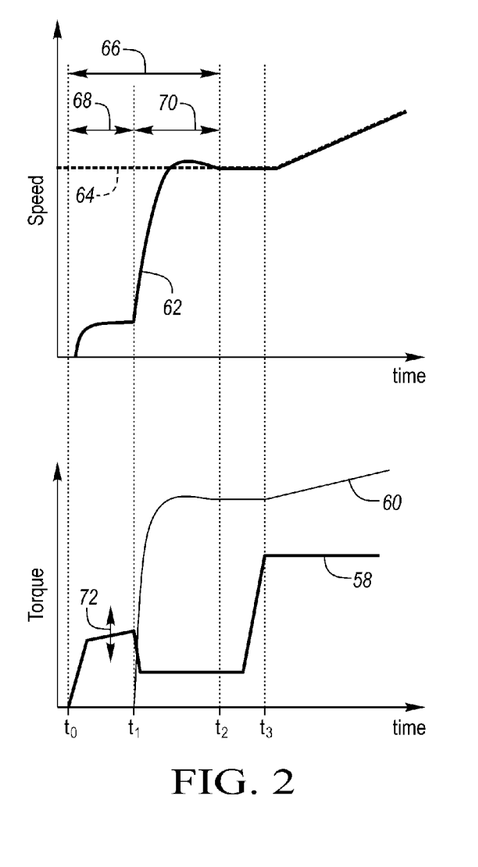
FIG. 2 is a graphical representation of a bump start of an engine in a hybrid electric vehicle.

Referring to FIG. 2, a graphical representation of a scheduled bump start of the engine 14 is illustrated. During a bump start, the engine 14 is started by transferring energy from the transmission 16 or M/G 18 to the engine 14 by at least partially engaging the disconnect clutch 26. A bump start may be implemented and executed by the controller 50. Line 58 represents a scheduled torque applied by the disconnect clutch 26 plotted against time, line 60 represents a scheduled torque of the engine 14 plotted against time, line 62 represents a scheduled speed of the engine (which may correspond to an angular velocity of the crankshaft 28, $\omega_{crank}$ plotted against time, and line 64 represents a scheduled speed of the M/G 18 (which may correspond to the output speed of the disconnect clutch 26 and angular velocity of M/G shaft 30, $\omega_{mg\_shaft}$) plotted against time.

The scheduled start-up time of the engine 14 spans the time period between $t_0$ and $t_2$, and is represented by line 66. The scheduled cranking time of the engine 14 spans the time period between $t_0$ and $t_1$, and is represented by line 68. The scheduled run-up time of the engine 14 spans the time period between $t_1$ and $t_2$, and is represented by line 70. The scheduled start-up time 66, scheduled cranking time 68, and scheduled run-up time 70 may be constant values or may be a range of values that span upper and lower thresholds. The scheduled start-up time 66 may correspond to a target start-up time. The target start-up time may be a constant value or a range of values between the upper and lower thresholds of the scheduled start-up time 66. The scheduled cranking time 68 may correspond to a target cranking time. The target cranking time may be a constant value or a range of values between the upper and lower thresholds of the scheduled cranking time 68. The scheduled run-up time 70 may correspond to a target run-up time. The target run-up time may be a constant value or a range of values between the upper and lower thresholds of the scheduled run-up time 70. During the scheduled cranking time 68, the disconnect clutch 26 is closed and the torque of disconnect clutch 26 is quickly ramped up. The torque of the disconnect clutch 26 may be ramped up to a constant value or to a ramped value that continues to increase in torque until the scheduled cranking time 68 ends. The torque from the disconnect clutch 26 increases the speed of the engine 14 from a stopped or shutdown position at $t_0$ to a first firing top dead center position at $t_1$, during the scheduled cranking time 68. Time $t_0$ may correspond to the initial contact between the input and the output of the disconnect clutch 26 during the closing of the disconnect clutch 26.

Once the engine has reached the first firing top dead center position, at time $t_1$, the scheduled run-up time 70 of the engine 14 commences, where fuel and spark are applied, and combustion of the engine 14 commences. During the scheduled run-up time 70, the combustion of the engine 14 is controlled to increase the torque and speed of the engine 14 until the engine 14 obtains the speed of the M/G 18 and/or the output speed of the disconnect clutch 26 at time $t_2$. Also, during the scheduled run-up time 70 of a bump start, the torque of the disconnect clutch 26 is decreased until the engine 14 obtains the speed of the M/G 18 and the output speed of the disconnect clutch 26 at time $t_2$. Once the engine has obtained the speed of the M/G 18 and the output speed of the disconnect clutch 26 at time $t_2$, the torque of the disconnect clutch 26 is ramped up in order to lock the disconnect clutch 26 which occurs at time $t_3$.

If an actual start-up time or an actual cranking time differs from the scheduled start-up time 66 or the scheduled cranking time 68, respectively, during a bump start, the torque of the disconnect clutch 26 may be adjusted up or down, by the controller 50, during the scheduled cranking time 68 of a subsequent starting event of the engine 14, as indicated by line 72. The scheduled torque applied by the disconnect clutch 26 may be adjusted (during the scheduled start-up time 66 of the subsequent starting event of the engine 14) such that the actual start-up time is greater than a lower threshold of the scheduled start-up time 66 and/or less than an upper threshold of the scheduled start-up time 66. Alternatively, the scheduled torque applied by the disconnect clutch 26 may be adjusted (during the scheduled cranking time 68 of the subsequent starting event of the engine 14) such that the actual cranking time is greater than a lower threshold of the scheduled cranking time 68 and/or less than an upper threshold of the scheduled cranking time 68.

Figure 3:
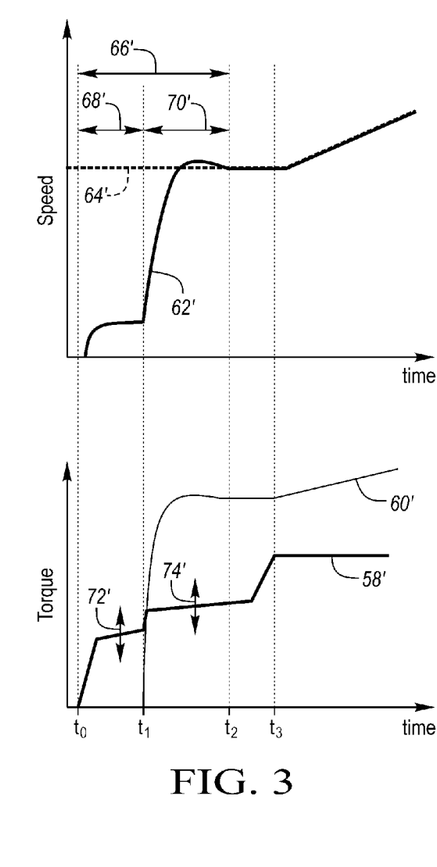
FIG. 3 is graphical representation of a ramp start of an engine in a hybrid electric vehicle.

Referring to FIG. 3, a graphical representation of a scheduled ramp start of the engine 14 is illustrated. During a ramp start, the engine 14 is started by transferring energy from the transmission 16 or M/G 18 to the engine 14 by at least partially engaging the disconnect clutch 26. A ramp start may be implemented and executed by the controller 50. Line 58' represents a scheduled torque applied by the disconnect clutch 26 plotted against time, line 60' represents a scheduled torque of the engine plotted against time, line 62' represents a scheduled speed of the engine (which may correspond to an angular velocity of the crankshaft 28, $\omega_{crank}$) plotted against time, and line 64' represents a scheduled speed of the M/G 18 (which may correspond to the output speed of the disconnect clutch 26 and angular velocity of M/G shaft 30, $\omega_{mg\ shaft}$) plotted against time.

The scheduled start-up time of the engine 14 spans the time period between $t_0$ and $t_2$, and is represented by line 66'. The scheduled cranking time of the engine 14 spans the time period between $t_0$ and $t_1$, and is represented by line 68'. The scheduled run-up time of the engine 14 spans the time period between $t_1$ and $t_2$, and is represented by line 70'. The scheduled start-up time 66', scheduled cranking time 68', and scheduled run-up time 70' may be constant values or may be a range of values that span upper and lower thresholds. The scheduled start-up time 66' may correspond to a target start-up time. The target start-up time may be a constant value or a range of values between the upper and lower thresholds of the scheduled start-up time 66'. The scheduled cranking time 68' may correspond to a target cranking time. The target cranking time may be a constant value or a range of values between the upper and lower thresholds of the scheduled cranking time 68'. The scheduled run-up time 70' may correspond to a target run-up time. The target run-up time may be a constant value or a range of values between the upper and lower thresholds of the scheduled run-up time 70'. During the scheduled cranking time 68', the disconnect clutch 26 is closed and the torque of disconnect clutch 26 is quickly ramped up. The torque of the disconnect clutch 26 may be ramped up to a constant value or to a ramped value that continues to increase in torque until the scheduled cranking time 68' ends. The torque from the disconnect clutch 26 increases the speed of the engine 14 from a stopped or shutdown position at $t_0$ to a first firing top dead center position at $t_1$, during the scheduled cranking time 68'. Time $t_0$ may correspond to the initial contact between the input and the output of the disconnect clutch 26 during the closing of the disconnect clutch 26.

Once the engine has reached the first firing top dead center position, at time $t_1$, the scheduled run-up time 70' of the engine 14 commences, where fuel and spark are applied, and combustion of the engine 14 commences. During the scheduled run-up time 70', the combustion of the engine 14 is controlled to increase the torque and speed of the engine 14 until the engine 14 obtains the speed of the M/G 18 and/or the output speed of the disconnect clutch 26 at time $t_2$. Also, during the scheduled run-up time 70' of a ramp start, the torque of the disconnect clutch 26 is either held at the cranking value, raised to an intermediate constant value, or raised to ramped value that continues to increase in torque until the engine 14 obtains the speed of the M/G 18 and the output speed of the disconnect clutch 26 at time $t_2$. Once the engine has obtained the speed of the M/G 18 and the output speed of the disconnect clutch 26 at time $t_2$, the torque of the disconnect clutch 26 is ramped up in order to lock the disconnect clutch 26 which occurs at time $t_3$.

If an actual start-up time, an actual cranking time, or actual run-up time differs from the scheduled start-up time 66', scheduled cranking time 68', or scheduled run-up time 70', respectively, during a ramp start, the torque of the disconnect clutch 26 may be adjusted up or down, by the controller 50, during the scheduled cranking time 68' of a subsequent starting event of the engine 14, as indicated by line 72', and/or during the scheduled run-up time 70' of the subsequent starting event of the engine 14, as indicated by line 74'. The scheduled torque applied by the disconnect clutch 26 may be adjusted (during the scheduled cranking time 68' and/or the scheduled run-up time 70' of the subsequent starting event of the engine 14) such that the actual start-up time is greater than a lower threshold of the scheduled start-up time 66' and/or less than an upper threshold of the scheduled start-up time 66'. Alternatively, the scheduled torque applied by the disconnect clutch 26 may be adjusted (during the scheduled cranking time 68' of the subsequent starting event of the engine 14) such that the actual cranking time is greater than a lower threshold of the scheduled cranking time 68' and/or less than an upper threshold of the scheduled cranking time 68'. In another alternative, the scheduled torque applied by the disconnect clutch 26 may be adjusted (during the scheduled run-up time 70' of the subsequent starting event of the engine 14) such that the actual run-up time is greater than a lower threshold of the scheduled run-up time 70' and/or less than an upper threshold of the scheduled run-up time 70'.

The target start-up time, target cranking time, and target run-up time, during either a bump start or a ramp start, may be functions of the shutdown position of the engine 14 relative to the first firing top dead center position, barometric pressure, intake manifold pressure, engine coolant temperature, engine oil temperature, air charge temperature, input speed of the transmission (which may correspond to the output speed of the disconnect clutch 26 and the speed of the M/G 18), and the hydraulic fluid temperature (if the disconnect clutch 26 is a hydraulic clutch).

The target start-up time, target cranking time, and/or target run-up time may increase as the angular displacement required or the amount of cylinder pressure compression that must be overcome in order to crank the engine 14 to the first firing top dead center position increases. The angular displacement required and the amount of cylinder pressure compression that must be overcome in order to crank the engine 14 to the first firing top dead center position are both functions of the shutdown position of the engine 14 relative to the first firing top dead center position and increase as the shutdown position of the engine 14 relative to the first firing top dead center position increases.

Additionally, the target start-up time, target cranking time, and/or target run-up time may increase as the cylinder pressure compression torque increases while cranking the engine 14. As the barometric pressure and/or intake manifold pressure increases, an increase in the cylinder pressure compression torque may result, in turn increasing the target start-up time, target cranking time, and/or target run-up.

The engine 14 may operate more efficiently once the temperatures of the engine coolant and engine oil are above certain temperature values. When an internal combustion engine is operating at a temperature below the temperature threshold, internal engine friction losses (including friction losses that occur at the piston to cylinder ring interfaces, various bearings, and valve train components) may increase. This is a function of engine oil and metal temperatures being below a threshold, both of which are influenced by engine coolant temperature. Also, fuel tends to form a film on the internal surfaces of the air intake components of the engine, which disrupts the air/fuel control system when the engine 14 is operating below the threshold temperature. As friction losses of the engine 14 increase, due to the engine coolant temperature and engine oil temperature being below a threshold, an increase in the target start-up time, target cranking time, and/or target run-up time may be required to overcome the increased friction. Additionally, an increase in the target start-up time, target cranking time, and/or target run-up time may be required to overcome the disrupted air/fuel mixture that occurs while the engine 14 is operating below a threshold.

The air/fuel mixture may also be affected by the air charge temperature, which refers to the air density. As the air density decreases, the amount of fuel that may be injected into the cylinders of the engine 14 will also decrease. A decrease in the amount fuel may lead to a decrease in the power the engine 14 is capable of producing, which in turn may lead to an increase in the target start-up time, target cranking time, and/or target run-up time.

The friction between the moving parts of the disconnect clutch 26 may change as the temperature of the components of the disconnect clutch 26 and/or the temperature of the hydraulic fluid (if the disconnect clutch 26 is a hydraulic clutch) changes. This may affect the amount of torque that may be transferred between the M/G 18 and the engine 14, and the amount of torque that may be transferred between the opposing sides of the disconnect clutch 26. Therefore, the target start-up time, target cranking time, and/or target run-up time may need to be adjusted depending on how the temperature of the components of the disconnect clutch 26 and/or the temperature of the hydraulic fluid effects the amount of torque that may be transferred between the M/G 18 and engine 14.

The target start-up time, target cranking time, and/or target run-up may also need to be adjusted base on input speed of the transmission (which may correspond to the output speed of the disconnect clutch 26 and the speed of the M/G 18). Since starting the engine 14 requires bringing the engine speed up to the input speed of the transmission, an increase in the input speed of the transmission will result in an increased target start-up time, target cranking time, and/or target run-up time.

Figure 4:
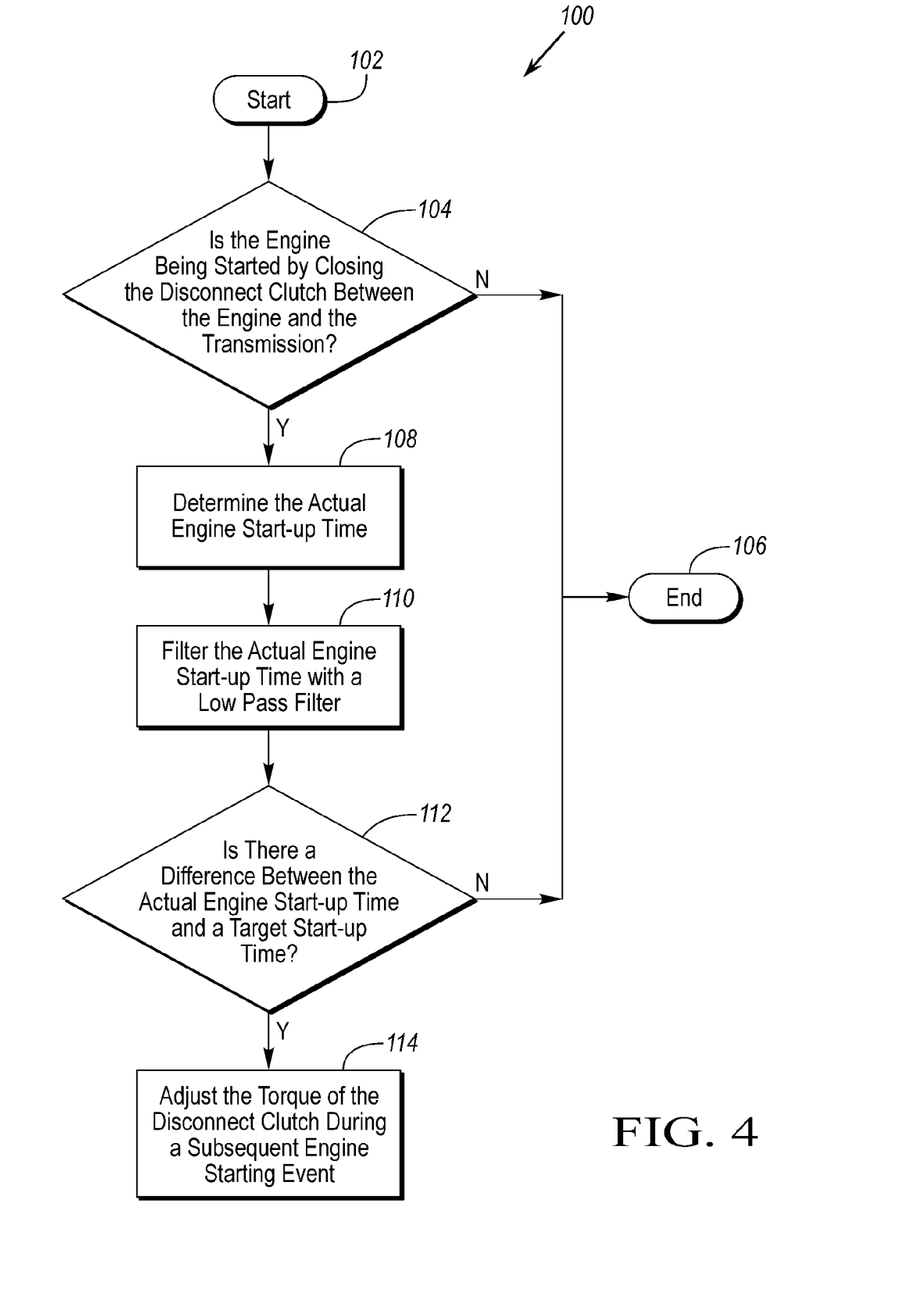
FIG. 4 is a flow chart of an algorithm for adjusting the torque of a disconnect clutch during an engine starting event.

Referring to FIG. 4, a method 100 of adjusting the torque of the disconnect clutch 26 during an engine starting event is illustrated. The method may be applicable to both ramp starts and bumps starts of the engine 14, discussed above. The method 100 may be implemented and executed by the controller 50. The method 100 is initiated at the start block 102. The method 100 may be initiated by placing a vehicle ignition into an "on" position, pressing a "start/run"button, placing the transmission of the HEV 10 into a specific gear selection, or by any other appropriate condition of the HEV 10.

After the method 100 is initiated at step 102, the method moves on to step 104 where it is determined if the engine 14 is being started by closing the disconnect clutch 26 between the engine 14 and transmission 16 or the M/G 18. If the engine 14 is not being started by closing the disconnect clutch 26, the method 100 ends at step 106. If the engine 14 is being started by closing the disconnect clutch 26, the method 100 moves on to step 108.

At step 108, the actual engine start-up time is determined. The actual engine start-up time determined at step 108 may refer the actual total start-up time (the actual time it takes the engine 14 to reach the output speed of the disconnect clutch 26 and M/G 18 from a stopped or shutdown position), the actual cranking time (the actual time it takes the engine 14 to reach the first firing top dead center position from a stopped or shutdown position), or the actual run-up time (the actual time it takes the engine 14 to reach the output speed of the disconnect clutch 26 and M/G 18 from the first firing top dead center position). The actual engine start-up time may refer to the start-up time of a previously or recently recorded engine staring event. Alternatively, the actual engine start-up time may refer to the average of the actual start-up times of a plurality of previously executed engine starting events.

Once the actual engine start-up time is determined at step 108, the method moves on to step 110 where the actual engine start-up time is limited to a range between a lower cutoff limit and an upper cutoff limit by a low-pass filter.

After the actual engine start-up time has been filtered at step 110, the method 100 moves on to step 112 where it is determined if there is a difference between the actual engine start-up time and a target engine start-up time. The target engine start-up time may be also determined at step 112 and may refer to the total target start-up time (the target time for the engine 14 to reach the output speed of the disconnect clutch 26 and M/G 18 from a stopped or shutdown position), the target cranking time (the target time for the engine 14 to reach the first firing top dead center position from a stopped or shutdown position), or the target run-up time (the target time for the engine 14 to reach the output speed of the disconnect clutch 26 and M/G 18 from the first firing top dead center position). The target engine start-up time may have a specific acceptable value or may have a range of acceptable values. If there is no a difference (or a large enough difference in the case where a range of values is acceptable) between the actual engine start-up time in the target engine start-up time, the method 100 ends at step 106. If there is a difference (or a large enough difference in the case where a range of values is acceptable) between the actual engine start-up time and the target engine start-up time, the method 100 moves on to step 114.

At step 114, the torque of the disconnect clutch 26 is adjusted during a subsequent engine starting event (the torque adjusted at step 114 may be a scheduled torque applied by the disconnect clutch 26 during the subsequent engine starting event, which may also comprise adjusting an engine start torque apply schedule for the disconnect clutch 26 for the subsequent engine starting event). The engine start torque apply schedule for the disconnect clutch 26 may be adjusted such that the actual engine start time is less than the upper threshold or greater than a lower threshold during the subsequent engine starting event. The torque of disconnect clutch 26 may be adjusted during total start-up time (the time it takes the engine 14 to reach the output speed of the disconnect clutch 26 and M/G 18 from a stopped or shut-down position), the cranking time (the time it takes the engine 14 to reach the first firing top dead center position from a stopped or shutdown position), or the run-up time (the time it takes the engine 14 to reach the output speed of the disconnect clutch 26 and M/G 18 from the first firing top dead center position) of the subsequent engine starting event. If the disconnect clutch 26 is a hydraulic clutch, the torque of disconnect clutch 26 may be adjusted by adjusting the applied pressure, $P_{apply}$, of the disconnect clutch 26. The torque (or applied pressure) of the disconnect clutch 26 may be adjusted by an additive term, a multiplier term, a look-up table, or may be adaptively learned. The torque (or applied pressure) adjustment of the disconnect clutch 26 may be based on a ratio of the actual engine start-up time to the target engine start-up time or may be based on a difference between the actual engine start-up time and the target engine start-up time.

An example of adjusting the torque of the disconnect clutch during a subsequent engine starting event, may be based on Equation (4):

$$T_{sub} = T_{actual}\left(K_{adapt} * \frac{t_{actaul}}{t_{target}}\right) \quad (4)$$

$T_{sub}$ is the adjusted torque value during a subsequent engine starting event.

$T_{actual}$ is the actual torque of the disconnect clutch 26 during the current or previous engine starting event.

$K_{adapt}$ is an adaptive constant used as a multiplier term to adjusted torque of disconnect clutch during a subsequent engine starting event.

$t_{actual}$ is the actual start -up time of the engine 14 during the current or previous engine starting event, which may correspond to the actual total start-up time, the actual cranking time, or the actual run-up time.

$t_{target}$ is the target start-up time of the engine 14 during the current or previous engine starting event, which may correspond to the total target start-up time, the target cranking time, or the target run-up time.

It should be understood that the method 100 described in FIG. 4 is merely descriptive and the disclosure should not be construed as limited to the particular description in FIG. 4. Some of the steps in FIG. 4 may be omitted and/or the chronological order of the particular steps may be rearranged.

Additionally, the method 100 described in FIG. 4 may apply differently when the engine starting event is a first start of a drive cycle. When an engine has not been running for a period of time, the oil lubricating the moving parts in the engine may settle leading to an increase in friction between the moving parts. The settled oil will be reapplied to the moving parts once the engine is started, however, there may be an increased start-up time during the first start of a drive cycle due to the increase in friction. Therefore, the target start-up time may be adjusted when the method is applied to a first start of a drive cycle to compensate for the increased friction. For example, the actual engine start-up time may be an actual first engine start-up time of the drive cycle, the target engine start-up time may be a target first engine start-up time of the first start of the drive cycle, and the torque of the disconnect clutch may be adjusted during a subsequent first engine start of a subsequent drive cycle based on the actual first engine start-up time of the drive cycle and the target first engine start-up time of the first start of the drive cycle.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine;
   a transmission;
   a clutch configured to couple the engine and transmission during engine starts; and
   a controller programmed to, in response to an actual engine start time exceeding an upper threshold time for an engine start event, alter an engine start torque apply schedule for the clutch during a next engine start event such that the actual engine start time is less than the upper threshold time.

2. The vehicle of claim 1, wherein the controller is further programmed to, in response to the actual engine start time being less than a lower threshold time for the engine start event, alter the engine start torque apply schedule for the clutch during the next engine start event such that the actual engine start time is greater than the lower threshold time.

3. The vehicle of claim 2, wherein the actual engine start time is defined by a time period beginning with initial contact of the clutch and ending with the engine obtaining a first firing top dead center position, and the upper and lower threshold times define a target time range for the time period.

4. The vehicle of claim 3, wherein the controller is further programmed to alter the engine start torque apply schedule before the next engine start event.

5. The vehicle of claim 4, wherein the engine start torque apply schedule is altered based on a ratio of the actual engine start time to a time falling within the target time range.

6. The vehicle of claim 4, wherein the engine start torque apply schedule is altered based on a difference between the actual engine start time and a target time that is within the target time range.

7. The vehicle of claim 2, wherein the actual engine start time is defined by a time period beginning with the engine obtaining a first firing top dead center position and ending with a speed of the engine becoming equal to an output speed of the clutch, and the upper and lower threshold times define a target time range for the time period.

8. The vehicle of claim 2, wherein the engine start torque apply schedule is altered based on an engine coolant temperature, an engine oil temperature, or a barometric pressure.

9. The vehicle of claim 2, wherein the upper and lower threshold times have a same value.

10. A method of operating a clutch configured to couple an engine to a transmission of a vehicle during engine starts comprising:

in response to an actual engine start time exceeding an upper threshold time for an engine start event, altering an engine start torque apply schedule for the clutch during a subsequent engine start event such that the actual engine start time is less than the upper threshold time.

11. The vehicle of claim 7, wherein the controller is further programmed to alter the engine start torque apply schedule before the next engine start event.

12. The vehicle of claim 11, wherein the engine start torque apply schedule is altered based on a ratio of the actual engine start time to a time falling within the target time range.

13. The vehicle of claim 11, wherein the engine start torque apply schedule is altered based on a difference between the actual engine start time and a time falling within the target time range.

14. The method of claim 10, further comprising:

in response to the actual engine start time being less than a lower threshold time for the engine start event, altering the engine start torque apply schedule during the subsequent engine start event such that the actual engine start time is greater than the lower threshold time.

15. The method of claim 14, wherein the upper and lower threshold times define a target time range, and the engine start torque apply schedule is altered based on a difference between the actual engine start time and a time falling within the target time range.

16. The method of claim 14, wherein the upper and lower threshold times define a target time range, and the engine start torque apply schedule is altered based on a ratio of the actual engine start time to a time falling within the target time range.

* * * * *